United States Patent
Molard et al.

(10) Patent No.: US 9,690,320 B2
(45) Date of Patent: Jun. 27, 2017

(54) CONTROL MODULE COMPRISING A TOUCH-SENSITIVE SURFACE

(71) Applicant: DELPHI TECHNOLOGIES, INC., Troy, MI (US)

(72) Inventors: Yannick Molard, Hersbach (FR); Claude Simon, Plobsheim (FR)

(73) Assignee: Delphi Technologies, Inc., Troy, MI (US)

( * ) Notice: Subject to any disclaimer, the term of this patent is extended or adjusted under 35 U.S.C. 154(b) by 128 days.

(21) Appl. No.: 14/424,054

(22) PCT Filed: Aug. 23, 2013

(86) PCT No.: PCT/EP2013/002545
§ 371 (c)(1),
(2) Date: Feb. 26, 2015

(87) PCT Pub. No.: WO2014/032786
PCT Pub. Date: Mar. 6, 2014

(65) Prior Publication Data
US 2015/0227163 A1    Aug. 13, 2015

(30) Foreign Application Priority Data
Aug. 30, 2012    (FR) ...................................... 12 58104

(51) Int. Cl.
*G06F 1/16* (2006.01)
*G06F 3/041* (2006.01)
(Continued)

(52) U.S. Cl.
CPC ............ *G06F 1/16* (2013.01); *G06F 3/03547* (2013.01); *G06F 3/041* (2013.01); *G06F 3/043* (2013.01);
(Continued)

(58) Field of Classification Search
CPC .... G06F 3/03547; G06F 3/044; G06F 1/1626; G06F 3/041–3/047
See application file for complete search history.

(56) References Cited

U.S. PATENT DOCUMENTS 6,072,475 A * 6/2000 van Ketwich ........ G06F 3/0213
345/156
7,253,643 B1 * 8/2007 Seguine .................. G06F 3/044
324/686
(Continued)

FOREIGN PATENT DOCUMENTS

EP    2 416 338 A1    2/2012
WO    2009/024971 A2    2/2009

OTHER PUBLICATIONS

International Search Report dated Sep. 30, 2013.

*Primary Examiner* — Sanjiv D Patel
(74) *Attorney, Agent, or Firm* — Lawrence D. Hazelton

(57) ABSTRACT

A control module includes a fixed control apparatus which is provided with a touch-sensitive surface so as to provide a control signal representative of the position or of the movement of a finger on the sensitive surface. The sensitive surface of the control apparatus includes a toroidal portion arranged about a main axis. The control module includes a control unit which is designed to detect an axial component and a circumferential component of a tactile movement on the sensitive surface so as to produce a processed control signal which is a function of these two components.

11 Claims, 2 Drawing Sheets

(51) Int. Cl.
*G06F 3/0354* (2013.01)
*G06F 3/043* (2006.01)
*G06F 3/044* (2006.01)
*G06F 3/045* (2006.01)
*G06F 3/0485* (2013.01)
*G06F 3/0488* (2013.01)

(52) U.S. Cl.
CPC .............. *G06F 3/044* (2013.01); *G06F 3/045* (2013.01); *G06F 3/0412* (2013.01); *G06F 3/0485* (2013.01); *G06F 3/0488* (2013.01)

(56) References Cited

U.S. PATENT DOCUMENTS

| | | | |
|---|---|---|---|
| 2010/0060568 A1* | 3/2010 | Fisher | G06F 3/03547 345/156 |
| 2010/0188268 A1* | 7/2010 | Grignani | G06F 3/0485 341/22 |
| 2011/0000773 A1* | 1/2011 | Laurent | G06F 3/03547 200/511 |
| 2011/0292268 A1* | 12/2011 | Mann | B62D 1/046 348/333.01 |
| 2012/0212938 A1* | 8/2012 | Nguyen | F21V 21/08 362/104 |

* cited by examiner

CONTROL MODULE COMPRISING A TOUCH-SENSITIVE SURFACE

CROSS-REFERENCE TO RELATED APPLICATION

This application claims the benefit under 35 U.S.C. §371 of published PCT Patent Application Number PCT/EP 2013/002545, filed Aug. 23, 2013, claiming priority to French patent application number FR1258104 filed on Aug. 30, 2012, and published as WO2014/032786 on Mar. 6, 2014, the entire contents of which is hereby incorporated by reference herein.

TECHNICAL FIELD OF INVENTION

The present invention relates to an electronic control module in particular designed to be arranged in the passenger space of a motor vehicle.

BACKGROUND OF INVENTION

The present invention relates more particularly to a control module which acts as an interface for a user to control and display different functions on a display screen, the said functions being linked to different parameters of the motor vehicle or of audio video equipment fitted to the vehicle.

It is known to use a control apparatus based on tactile surfaces, i.e. using means for detection of the movements of the finger of a user to control functions. Various detection solutions have already been proposed, in particular force sensors, resistive or capacitive sensors, etc.

The present invention is intended to propose a control apparatus for a control module which is more ergonomic and which facilitates manipulation by a user, particularly by a vehicle driver.

SUMMARY OF THE INVENTION

Described herein is a control module including a fixed control apparatus which is provided with a touch-sensitive surface so as to provide a control signal representative of the position or of the movement of a finger on the touch-sensitive surface. The touch-sensitive surface of the control apparatus includes a toroidal portion, which is arranged about a main axis. The control module includes a control unit which is designed to detect an axial component and a circumferential component of a tactile movement on the touch-sensitive surface so as to produce a processed control signal which is a function of these two components.

The control module in accordance with the invention presents improved ergonomics due to the control apparatus and its toroidal shape. Indeed, the user can follow the touch-sensitive surface with his finger intuitively by following the toroidal shape by touch. This toroidal shape provides him with an indication as to the rotary nature of the movement and allows him/her to link to a scroll list for a determined function.

The toroidal shape is particularly suitable for users whose fingers have relatively long nails. Indeed, the applicant has found that the reliability of a flat tactile sensor could be called into question when the fingernail of a user is in contact with the touch-sensitive surface of the sensor during a manipulation. The control apparatus in accordance with the invention is suited to any type of user and any type of finger, whatever the length of his nails, and whatever the diameter of the finger.

The control apparatus in accordance with the invention permits the use of an axial component of the tactile movement, in addition to the circumferential component, without requiring a touch-sensitive surface of large dimension.

In accordance with other characteristics of the invention: the display device includes a display screen of which at least one function is controlled by the control apparatus; the function includes a list the scrolling of which is controlled by the circumferential component of the tactile movement and the validation of which is controlled by the axial component of the tactile movement; the toroidal portion has an annular shape which defines a central cavity, the touch-sensitive surface being arranged on the inner rim of the annular shape; the central cavity opens on both sides of the main axis; the touch-sensitive surface is defined, relative to an adjacent inert surface, by a circumferential rim forming a circumferential guiding surface; the touch-sensitive surface of the control apparatus is formed by moulding with a case; the control apparatus is arranged in a corner of the case; the touch-sensitive surface is provided with a capacitive or resistive sensor; the control device includes an acoustic wave sensor which is designed to detect the tactile movement on the touch-sensitive surface as a function of the propagation of the acoustic waves caused by the tactile movement on the touch-sensitive surface; the touch-sensitive surface includes at least one backlit sector; the touch-sensitive surface circumferentially includes an alternation of backlit sectors and of non-backlit sectors; the lighting of the backlit sectors is controlled as a function of the tactile movement on the touch-sensitive surface.

BRIEF DESCRIPTION OF DRAWINGS

Other characteristics, aims and advantages of the invention will become apparent on reading the following detailed description, with reference to the attached drawings given by way of non-limiting example and in which.

DETAILED DESCRIPTION

In the remainder of the description, similar or identical elements can be designated by the same reference signs.

Figure 1:
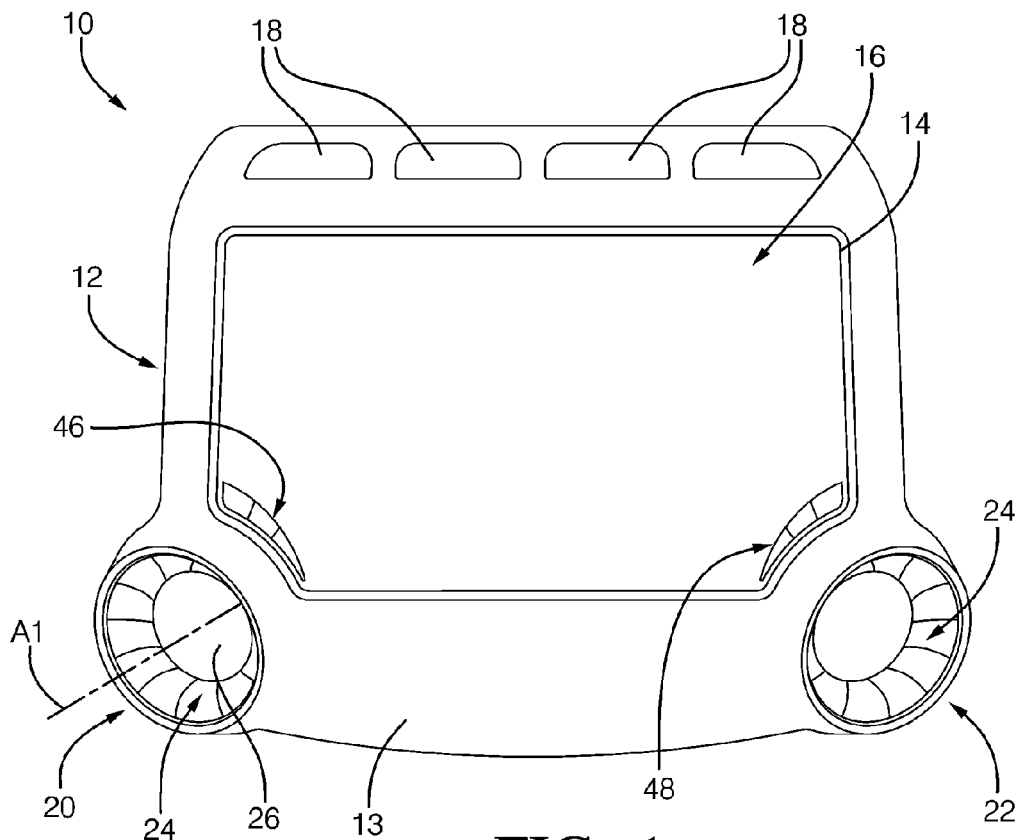
FIG. 1 is a frontal view which shows diagrammatically the front face of a control module provided with control apparatus in accordance with the teachings of the invention.

FIG. 1 shows a control module 10 designed to be arranged in the passenger space of a motor vehicle (not shown) in order to control different functions of the vehicle such as air-conditioning, the car radio, the navigation system, etc.

In accordance with the embodiment shown, the control module 10 includes a case 12 provided with a frame 14 which defines the edge of a display screen 16 and provided with switches 18 arranged at the periphery of the display screen 16, on the front face 13 of the case 12, so as to allow the control of different functions of the vehicle and so as to activate the display of corresponding information on the display screen 16.

The switches 18 can be formed of touch-sensitive surfaces, or tactile surfaces, or of mechanically actuated switches.

Figure 2:
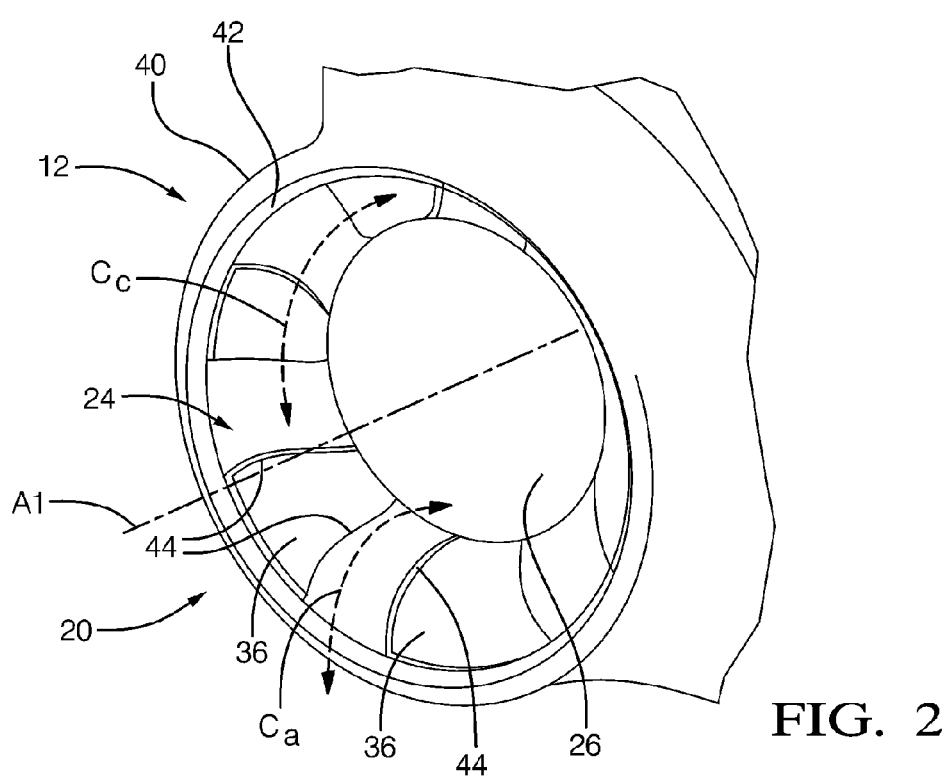
FIG. 2 is a detailed view of FIG. 1 which shows a control apparatus.

As shown in FIG. 1, and in more detail in FIG. 2, the control module 10 is here provided with two control apparatus 20, 22 in accordance with the teachings of the invention, which are arranged in each of the lower corners of the case 12. Each control apparatus 20, 22 includes a touch-sensitive surface 24 forming a generally toroidal convex portion about a main axis A1. The main axis A1 here extends in a direction substantially at right-angles to the general plane of the front face 13 of the case 12, or in a direction slightly inclined relative to a direction at right-angles to this general plane. In non-limiting manner, the main axis A1 is orientated from the front towards the rear when looking at the front face 13 of the case 12 which is provided with the display screen 16.

The toroidal portion here has an annular shape defining a central cavity 26 so that the touch-sensitive surface 24 extends along the inner rim of the annular shape.

Advantageously, the touch-sensitive surface 24 is formed by moulding with the case 12, i.e. each control apparatus 20, 22 is here formed of an extension of the case 12 generally in the form of a ring. The portion of the case 12 forming the touch-sensitive surface 24 here has, along an axial section, a generally semicircular outline, the outer convex rounded part being orientated towards the main axis A1 and the inner wall 27 being substantially cylindrical.

Each control apparatus 20, 22 is designed to detect a tactile movement on the touch-sensitive surface 24. More particularly, an electronic control unit 28 is provided which detects in the tactile movement its so-called circumferential component Cc, about the main axis A1, and its so-called axial component Ca, generally contained in an axial plane relative to the main axis A1, and which produces a processed control signal as a function of these two components Cc, Ca.

The tactile movement corresponds to the sliding of the finger of a user on the touch-sensitive surface 24. The control apparatus 20, 22 in accordance with the invention permits the detection of an essentially circumferential tactile movement, when the finger travels over the touch-sensitive surface 24 generally in a circumferential direction Cc, orientated in the clockwise or anticlockwise direction, and an essentially axial tactile movement, when the finger travels over the touch-sensitive surface 24, or slides on this, generally in an axial direction Ca i.e. generally in a direction contained in a plane passing through the main axis A1. An axial tactile movement can be directed towards the rear, the finger entering the central cavity 26 through the front of the control apparatus 20, 22, and it can be directed towards the front, the finger sliding on the touch-sensitive surface 24 coming out of the central cavity 26 and moving away from the front face 25 of the case 12.

Advantageously, in one operating embodiment, the circumferential component Cc of the tactile movement controls the scrolling of a list on the display screen 16 and the axial component Ca of the tactile movement causes the validation of the associated function in the list.

Other operating embodiments can be envisaged in which the circumferential Cc and axial Ca components are used differently. For example, a function can be controlled as a function of the relationship between the circumferential component Cc and the axial component Ca. The tactile movement on the touch-sensitive surface 24 can control the position of a cursor on the display screen 16 as a function of the two components Cc, Ca.

Figure 3:
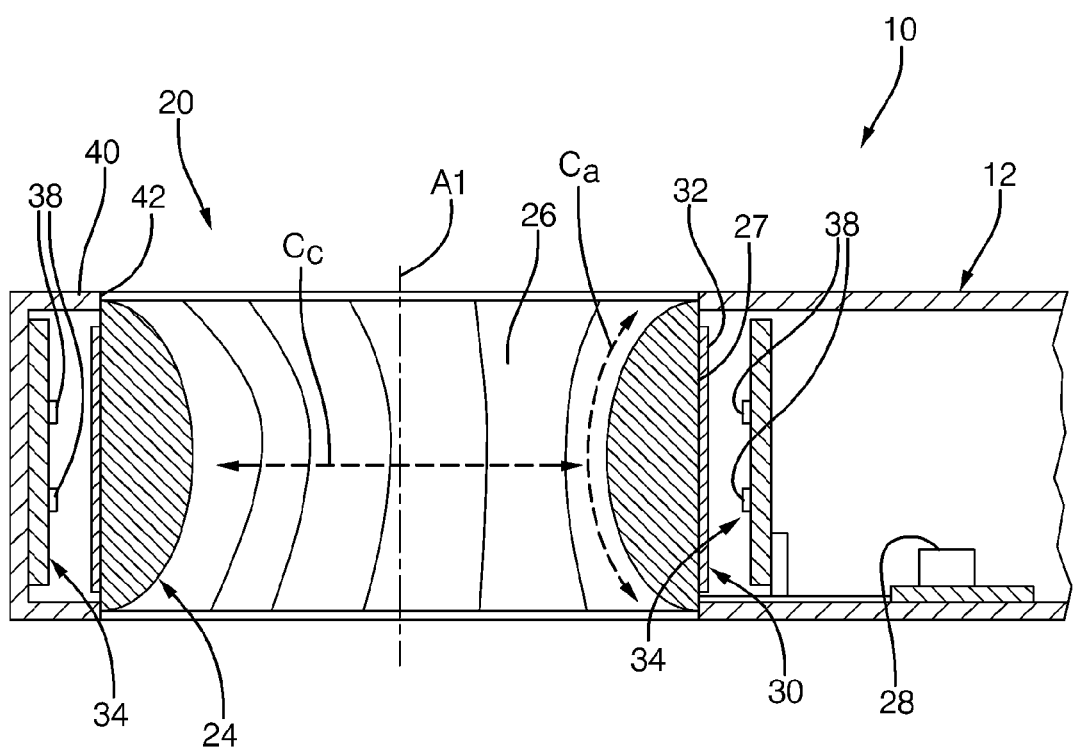
FIG. 3 is a view in axial section in the plane 3-3 which shows diagrammatically the control apparatus and the system for detection of touch.

The touch-sensitive surface 24 of each control apparatus 20, 22 is provided with means for the detection of touch 30 which are connected to the control unit 28 to allow the control of the functions displayed on the display screen 16. In accordance with a first embodiment, which is shown in FIG. 3, the means for the detection of touch 30 include a resistive or capacitive film 32 forming a tactile sensor which is designed to detect touch by measuring a change in resistance or in capacitance. The film 32 is here arranged on the inner wall 27 of the touch-sensitive surface 24.

The film 32 is electrically connected to a control unit 28 which is designed to process the information transmitted by the film 32 in order to determine the type of tactile movement detected on the touch-sensitive surface 24 and in order to emit a corresponding control signal to the display screen 16.

In accordance with a second embodiment, the film 32 can be replaced by an acoustic wave sensor which is designed to detect the tactile movement and its characteristics as a function of the propagation of the acoustic waves caused by the touch of the finger on the touch-sensitive surface 24. This type of detection technology, based on a piezoelectric sensor, is proposed by the company Sensitive Object and described in several documents, in particular in documents EP1512116A2, EP2116921A1, EP2175348A1.

Advantageously, each control apparatus 20, 22 is provided with a backlighting device 34 which is connected to the control unit 28 and which is designed to backlight sectors 36 of the touch-sensitive surface 24 distributed circumferentially around the periphery of the touch-sensitive surface 24. Preferably, the control unit 28 controls the backlighting of the backlit sectors 36, in particular in terms of intensity and colour, as a function of the control signal produced by the detection of the touch on the touch-sensitive surface 24.

The backlighting device 34 includes for example electroluminescent diodes 38 arranged in the case 12, in the proximity of the inner wall 27 of the touch-sensitive surface 24. The backlit sectors 36 are for example formed of a translucent material favouring the diffusion of the light produced by the backlighting device 34.

Preferably, the touch-sensitive surface 24 is defined, relative to an adjacent inert surface 40 of the case 12, by a circumferential rim 42 forming a circumferential guiding surface facilitating the sliding of the finger in the circumferential direction. The circumferential rim 42 here extends over an angular sector covering a large part of the circumference of the touch-sensitive surface 24, the circumferential rim 42 being interrupted along a portion adjoining the adjacent corner of the display screen 16.

The backlit sectors 36 of the touch-sensitive surface 24 can also be defined by borders 44 so as to provide the user with a tactile sensation allowing him to better control the speed and the positioning of his finger on the touch-sensitive surface 24.

Advantageously, in an operating embodiment shown in FIG. 1, the display screen 16 includes pictograms 46, 48 which extends in an arc of circle centred on the main axis A1 of the adjacent control apparatus 20, 22. These pictograms 46, 48 correspond to the display of the status of the functions controlled by the associated control apparatus 20, 22. Thus, the user immediately identifies the functional link between the control apparatus 20, 22 and the function represented by the associated pictogram 46, 48.

The invention claimed is:

1. A control module that includes a fixed control apparatus which is provided with a touch-sensitive surface so as to provide a control signal representative of position and movement of a finger on the touch-sensitive surface, the touch-sensitive surface of the control apparatus comprising:
   a toroidal-convex portion arranged about a main axis of the control apparatus, wherein the toroidal convex portion is characterized as having a three-dimensional shape that defines the touch-sensitive surface;

a control unit in communication with the touch-sensitive surface, said control unit configured to detect an axial component and a circumferential component of a tactile movement on the touch-sensitive surface so as to produce a processed control signal indicative of the axial component and the circumferential component, wherein the axial component is characterized as a combination of radial movement relative to the main axis and parallel movement parallel to the main axis;

a display screen of which at least one function is controlled by the control apparatus, wherein the function includes a list the scrolling of which is controlled by the circumferential component and the validation of which is controlled by the axial component.

2. The control module as described in claim 1, wherein the toroidal-convex portion has an annular shape which defines a central cavity, the touch-sensitive surface being arranged on an inner rim of the annular shape.

3. The control module as described in claim 2, wherein the central cavity opens on both sides of the main axis.

4. The control module as described in claim 1, wherein the touch-sensitive surface is defined, relative to an adjacent inert surface, by a circumferential rim forming a circumferential guiding surface.

5. The control module as described in claim 1 further comprising a case, wherein the touch-sensitive surface of the control apparatus is formed by molding with the case.

6. The control module as described in claim 1 further comprising a case, wherein the control apparatus is arranged in a corner of the case.

7. The control module as described in claim 1, wherein the touch-sensitive surface is provided with a capacitive or resistive sensor.

8. The control module as described in claim 1, wherein the control module includes an acoustic wave sensor which is designed to detect the tactile movement on the touch-sensitive surface as a function of the propagation of the acoustic waves caused by the tactile movement on the touch-sensitive surface.

9. The control module as described in claim 1, wherein the touch-sensitive surface includes at least one backlit sector.

10. The control module as described in claim 9, wherein the touch-sensitive surface includes circumferentially an alternation of backlit sectors and of non-backlit sectors.

11. The control module as described in claim 10, wherein the lighting of the backlit sectors is controlled as a function of the tactile movement on the touch-sensitive surface.

* * * * *